United States Patent [19]

Loewe et al.

[11] Patent Number: 5,046,677

[45] Date of Patent: Sep. 10, 1991

[54] CASSETTE FOR HOLDING A ROLL

[75] Inventors: Erhard Loewe, Waldesch; Ludger Bertels, Nottuln, both of Fed. Rep. of Germany

[73] Assignee: E. I. du Pont de Nemours and Company, Wilmington, Del.

[21] Appl. No.: 347,387

[22] Filed: May 1, 1989

[30] Foreign Application Priority Data

May 11, 1988 [DE] Fed. Rep. of Germany ....... 3816183

[51] Int. Cl.⁵ .......................... G03B 1/04; B65H 23/06
[52] U.S. Cl. ................................. 242/71.1; 242/55.53; 242/75.4; 242/99; 206/389
[58] Field of Search ...................... 242/71, 71.1, 71.7, 242/55.53, 99, 296, 199; 206/389, 395, 397, 407, 408, 409; 354/275; 57/70, 72; 81/3.7

[56] References Cited

U.S. PATENT DOCUMENTS

| 797,300 | 8/1905 | Loxterman | 242/99 |
|---|---|---|---|
| 1,168,307 | 1/1916 | Johnson | 242/296 X |
| 1,928,106 | 9/1933 | Koch et al. | 242/71.1 |
| 2,794,546 | 6/1957 | Miller | 206/397 X |
| 3,037,719 | 6/1962 | Bemmann | 242/71.1 |
| 3,944,148 | 3/1976 | Freeman et al. | 242/55.53 |
| 4,290,840 | 9/1981 | Pabodie et al. | 101/288 X |
| 4,361,391 | 11/1982 | Haraguchi et al. | 354/275 X |
| 4,600,286 | 7/1986 | Harvey | 242/71 X |
| 4,729,518 | 3/1988 | Mathna et al. | 242/55.53 |
| 4,830,305 | 5/1989 | Guggi et al. | 242/71.7 |
| 4,834,236 | 5/1989 | Buelens et al. | 242/71.1 |

FOREIGN PATENT DOCUMENTS

| 0263538 | 7/1987 | European Pat. Off. | 27/58 |
|---|---|---|---|
| 622632 | 12/1935 | Fed. Rep. of Germany | 242/71 |
| 2117800 | 4/1970 | Fed. Rep. of Germany | . |
| 353370 | 7/1931 | United Kingdom | 242/296 |
| 2192322 | 7/1986 | United Kingdom | 242/296 |

Primary Examiner—Stuart S. Levy
Assistant Examiner—Joseph A. Rhoa

[57] ABSTRACT

The present invention relates to a light-tight roll-film cassette for holding and dispensing rolls of light sensitive material, having brake means exerting a retarding force on the core of the roll. This brake means consist of a resilient tongue cooperating with the cylindric bearings.

10 Claims, 1 Drawing Sheet

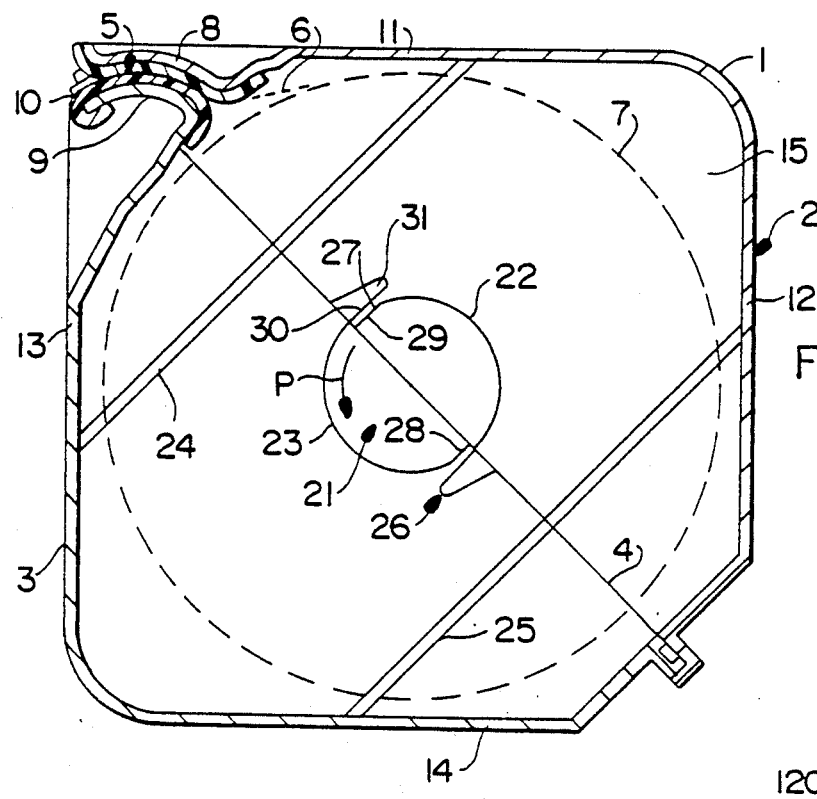
Fig. 1
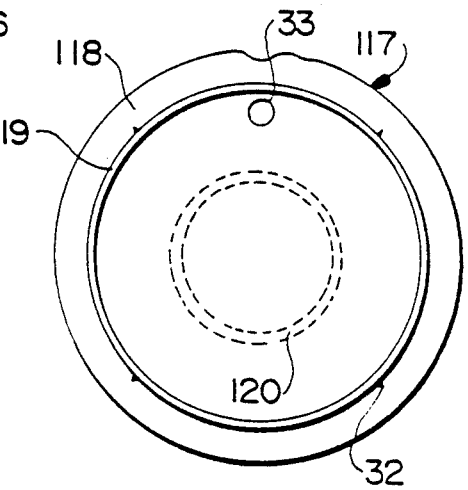
Fig. 3
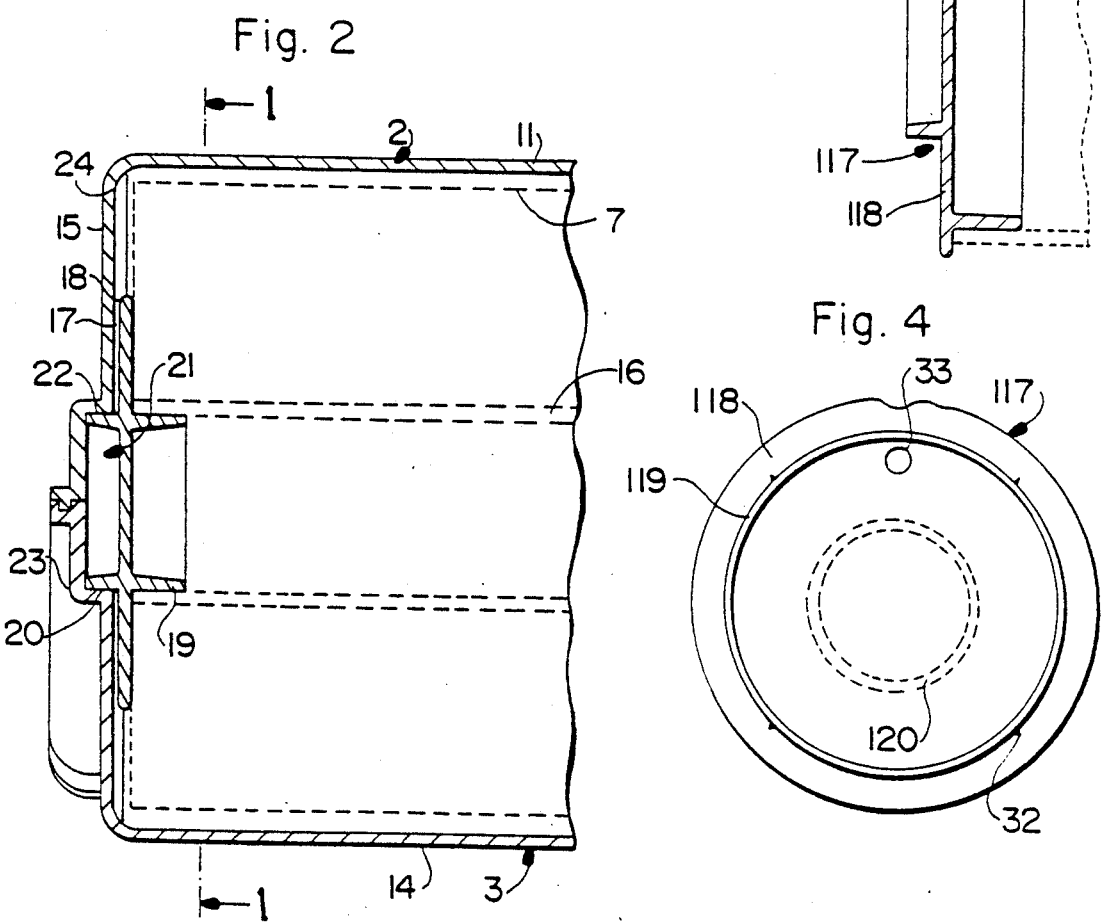
Fig. 2
Fig. 4

CASSETTE FOR HOLDING A ROLL

BACKGROUND OF THE INVENTION

1. Field of the Invention

This invention relates to a cassette for holding a roll of web material, the cassette having a housing with two side walls, and on each side wall of the housing a cylindrical bearing to support in a rotatable manner a core of the roll and, in particular, with at least one friction brake, which has at least one spring element that, in a relaxed position, projects into an open cross-section of the roll.

2. Description of Related Art

U.S. Pat. No. 3,944,148 discloses a cassette having a cylindrical housing of synthetic resin with side walls from which protrude cylinder segments that support on their outer surfaces a core of a roll of copying paper. A conical extension of one cylinder segment contains a shaped wire ring that engages this extension with three radially oriented tabs through circumferential slits and fits spring-like into the core. When the web material is unwound from the roll, some friction results, originating from the core rubbing against the cylinder segments and from the spring contact between the wire spring and the core, thus preventing an undesirable unrolling or back rotation of the roll. The bearing and friction relationships are different from one roll to another, because neither the core, which generally consists of cardboard, nor the wire spring are manufactured with adequate precision.

Similar cassettes of this type, but without friction brakes, are also known for rolls of photographic web material, either film or paper, for various purposes, such as portrait photography, photo typesetting, x-ray photography and the like. The cassettes are constructed to be lightproof. In one type of cassette, a cuboid or cylindrical housing wall is provided on each of the two side walls with a locking plate supporting a cylindrical bearing. In a second type of commercial cassette, two injection-molded half shells are bonded together along a diagonal juncture line to form a cuboid housing. Each half shell has a half of a bearing socket on each side wall.

It is believed desirable to make a cassette in which better defined bearing and friction relationships are attainable in a simple manner.

SUMMARY OF THE INVENTION

The present invention relates to a cassette for holding a roll having a friction brake. A spring strip is formed integrally with a cylindrical bearing of synthetic resin. In its relaxed position, the spring projects into the cross-section of the supported part. The bearing is made as a bearing socket and interacts with a bearing element on an insert that is inserted into the core of the roll by means of an insertion element. This results in better defined bearing and friction relationships.

In accordance with one aspect of the invention, the friction brake has a strip formed in one piece with the cylindrical bearing.

Such a spring strip can be made in a simple manner in the production of the cylindrical bearing or cassette housing, respectively, which consists of synthetic resin and is made particularly by injection molding, in which the strip can be mass produced with high precision. In addition, the strip surface in contact with the support part can be designed to be larger than is possible with a wire spring. In sum, therefore, better defined friction relationships result.

In particular, the spring strip can be oriented approximately tangential to the circumference of the cylindrical bearing. This yields proportionately larger contact surfaces.

An alternative solution, which can also be used simultaneously with the above described solution, provides that an insert with an insertion element engages the core tightly and is supported by a bearing element on the cylindrical bearing.

With the aid of this insert, which also can be injection molded from synthetic resin, the bearing element of the insert, rather than the core, interacts with the cylindrical bearing. As both parts can be made with high precision, the prescribed bearing relationships can be maintained reproducibly. It is also possible to make the bearing with a gentle clamping feature so that a desired braking effect occurs.

It is particularly desirable if the cylindrical bearing is a bearing socket and the bearing element projects to fit into the bearing socket. This permits, in particular, the use of cassette housings formed from two half shells.

In detail, the insert can have a flange that has an insertion element on one side and the bearing element on the other side. Such inserts can be made with low material cost, but with high stability.

In this connection, it is recommended that ribs with a height at least equal to the thickness of the flange be positioned outside the flange on the inner surfaces of the sides of the housing. These ribs assure that the flange has adequate space for its rotation and is not pressed against the frontal area of the side wall.

It is particularly important that the insert can form an adapter to fit cores of different diameters. It is necessary to have available inserts with bearing elements of the same diameter, but insertion elements of different diameters. Thus, one type of cassette can be used for rolls with cores of different diameters, for example, a film roll with a larger diameter core and a paper roll with a smaller diameter core. This leads to significant efficiencies in production and storage. If a friction brake with a spring strip is provided, it applies at the same time the same braking torque regardless of the diameter of the core.

It is recommended detailwise that the cassette housing be formed from two half shells that are bonded together along a juncture line, each half with a bearing socket, and that the spring strip be oriented approximately perpendicularly to the juncture line. The spring strip can be made together with the half shells by injection molding. Removal from the mold is not difficult.

In detail, the contact area of the spring strip on the inner side of the bearing socket can be oriented along a secant and the contact area running approximately parallel hereto on the opposite side of the strip is the side surface of a groove that has a depth greater than the length of the inner contact area. The greater depth of the groove means that the strip can be bent through a comparatively large space. Therefore, low friction forces can also be attained.

In particular, both halves of the bearing socket should each have a spring strip, which extends approximately tangential in the direction of unwinding rotation. Preferably the roll is braked by a total of four spring strips which results in adequate braking for conventional operation.

The insertion element can have ribs parallel to the axis for a tight fit. This assures that rotation occurs only between bearing element and cylindrical bearing and not between insertion element and core.

BRIEF DESCRIPTION OF THE DRAWINGS

The invention can be more fully understood from the following detailed description thereof in connection with accompanying drawings which form a part of this application and in which:

FIG. 1 is a cross-sectional view of a cassette in accordance with the present invention taken along the line A—A of FIG. 2.

FIG. 2 is a partial longitudinal cross-section through the cassette of FIG. 2.

FIG. 3 is a cross-section of a modified insert.

FIG. 4 is a side view of the insert of FIG. 3 from the left.

DESCRIPTION OF THE PREFERRED EMBODIMENT(S)

Throughout the following detailed description, similar reference numerals refer to similar elements in all Figures of the drawings.

Referring to FIG. 1, there is illustrated a lightproof cassette in accordance with the present invention. The cassette comprises a housing 1 formed from two half shells 2, 3, which are injection molded from synthetic resin and bonded together along three sides of a juncture line 4, for example, by ultrasonic bonding. The half shells 2, 3 form a cuboid delineated diagonally by juncture line 4. Within the cuboid forming the housing 1, an outlet slit 5 is located in an upper corner for a roll 6 of light-sensitive web material, paper in this instance, wound as a supply roll 7 indicated by dotted lines. The outlet slit 5 is bounded by lips 8, 9, each of which is formed on a half shell 2 and 3 respectively and provided with a lining 10 of fabric, felt or soft plastic to prevent light entry. Further, the housing 1 has four wall segments 11, 12, 13, 14, perpendicular to adjoining segments and joined together through curved or straight connecting segments, and two side walls 15.

Referring to FIG. 2, the roll 7 is wound on a core 16. An insert 17, made of an injection-molded synthetic resin part, has a flange 18 with an insertion element 19 projecting from one side and a bearing element 20 projecting from the other side. The insertion element 19 engages the core 16 in a manner such that a non-rotatable union therebetween results. The bearing element 20 fits in a bearing socket 21 formed from two half shells 22, 23 on the side wall 15. Ribs 24, 25 on an inner surface of the side wall 15 have a height that is at least equal to the thickness of the flange 18. These are positioned with the flange 18 between them so as to prevent the flange 18 from being immobilized between the side wall 15 and the side edge of the roll. This results in satisfactory suspension of the roll 7 with accurately defined bearing properties, because the bearing element 20 as well as the bearing socket 21 consist of injection-molded synthetic resin parts and can be produced with very accurate dimensions.

Referring again to FIG. 1, the bearing socket 21 is provided with a friction brake 26. This has two spring strips 27, 28 that are formed integrally with the bearing socket 21. An inner surface 29 of each strip 27, 28 is oriented along a secant of a circular cross-section that otherwise represents the bearing socket 21. An outer surface 30 of the strip 27, 28 is oriented approximately parallel thereto and is bounded by a groove 31 with a depth greater than the length of the inner surface 29. Consequently, the strip 27, 28 can be bent outwards radically away from the axis of rotation of the roll in a spring-like manner when the bearing element 20 is inserted, which leads to a definite frictional force. The direction of rotation of the roll 7 is indicated by the arrow P. The strips 27, 28 thus extend approximately tangential to the unwind direction.

FIGS. 3 and 4 show an insert 117 that also has a flange 118, an insertion element 119 to insert into a core 116 and a bearing element 120. The flange 118 and bearing element 120 correspond to the insert 17. However, the insertion element 119 has a larger diameter, because rolls of film have a larger diameter core 116. Therefore, the cassette of FIGS. 1 and 2 can also be used for a roll of film instead of a roll 7 of paper.

FIG. 4 shows locking ribs 32 applied to an outer surface of the insertion element 119 and parallel to its axis. Ribs can also be provided in a similar manner on the insertion element 19. In addition, a hole 33 is present to allow for air interchange on insertion.

The injection molded parts, that is, the two half shells 2, 3 and the inserts 17, 117, can be made from any suitable synthetic resin, for example, ABS, polystyrene or polyamide. However, the synthetic resin of the inserts 17, 117 should differ from that of the half shells 2, 3 to prevent the inserts from being welded to the housing 1 when the two half shells 2, 3 are bonded together.

The spring strips 27, 28 can also be mounted in cylindrical bearings, the outer surfaces of which serve as bearing surfaces. In this case, the springs or spring strips must project outward above the cylinder surface. The type of mounting described can also be used for cassettes that have a cuboid or cylindrical mid-section and end walls set on both sides.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A cassette for holding a roll of web material, the cassette comprising a housing having a pair of side walls, a substantially cylindrical bearing on each of the side walls, and at least one friction brake, characterized in that a pair of inserts are adapted to be rotatably supported on the substantially cylindrical bearings, each one of the inserts with an insertion element and a bearing element on distal sides of the insert, the cylindrical bearings form bearing sockets and the insertion elements protrude in the direction of the side walls to fit into the bearing sockets, the inserts are for holding a core of the roll, and the friction brake has a spring strip formed in one piece with a first one of the cylindrical bearings such that the spring strip, in a relaxed position, projects into a space that a section of one of the inserts occupies when the inserts are holding the core of the roll in the housing.

2. The cassette in accordance with claim 1, characterized in that the spring strip is oriented approximately tangential to the circumference of the first cylindrical bearing.

3. The cassette in accordance with claim 1, characterized in that each one of the inserts has a flange between the insertion element and the bearing element.

4. The cassette in accordance with claim 3 characterized in that ribs are positioned radially away from the flanges on inner sides of the side walls of the housing, the height of the ribs being at least equal to the flange thickness.

5. The cassette in accordance with claim 1, characterized in that the cassette housing is made from two half shells bonded together along a juncture line, each of the shells having a half of the bearing sockets and the spring strip is positioned approximately perpendicular to the juncture line.

6. The cassette in accordance with claim 5, characterized in that an inner surface of the spring strip on an inner side of the first bearing socket is oriented along a secant of a cross-section of the first bearing socket and an outer surface of the spring strip is oriented approximately parallel to the inner surface and is bounded by a groove, which has a greater depth than the length of the inner surface.

7. The cassette in accordance with claim 5, characterized in that the two halves of the bearing sockets each have one of the spring strips, which extend approximately tangentially in the unwind direction of the roll.

8. The cassette in accordance with claim 1, characterized in that each one of the inserts has locking ribs parallel to a rotational axis of the insert.

9. A cassette for holding a roll of web material, the cassette comprising a housing having side walls, a substantially cylindrical bearing on each of the side walls, and at least one friction brake, characterized in that an insert is adapted to be rotatably supported on each of the substantially cylindrical bearings, the inserts are for holding a core of the roll, and the friction brake has a spring strip formed in one piece with one of the cylindrical bearings such that, in a relaxed state, the spring strip projects radially towards the axis of rotation of the roll and into a space that a section of one of the inserts occupies when the inserts are holding the core of the roll in the housing.

10. A cassette for holding a roll of web material, the cassette comprising a housing having side walls, a substantially cylindrical bearing on each of the side walls, and at least one friction brake, characterized in that an insert is adapted to be rotatably supported on each of the substantially cylindrical bearings, the inserts are for holding a core of the roll, and the friction brake has a spring strip formed in one piece with one of the cylindrical bearings such that the spring strip, in a relaxed position, projects into a space that a section of the inserts occupies when the inserts are holding the core of the roll in the housing, and characterized in that when the bearing elements are inserted in the cylindrical bearings, one of the bearing elements causes the spring strip to bend outwards radially away from the axis of rotation of the roll.

* * * * *